(12) United States Patent
Jakobs

(10) Patent No.: US 10,003,668 B2
(45) Date of Patent: Jun. 19, 2018

(54) DATA TRANSFER FOR A TELECOMMUNICATION DEVICE

(71) Applicant: SAP SE, Walldorf (DE)

(72) Inventor: Daniel Jakobs, Ettlingen (DE)

(73) Assignee: SAP SE, Walldorf (DE)

( * ) Notice: Subject to any disclaimer, the term of this patent is extended or adjusted under 35 U.S.C. 154(b) by 53 days.

(21) Appl. No.: 14/957,002

(22) Filed: Dec. 2, 2015

(65) Prior Publication Data

US 2017/0094017 A1 Mar. 30, 2017

(30) Foreign Application Priority Data

Sep. 25, 2015 (EP) .................................... 15186971

(51) Int. Cl.
*H04W 72/00* (2009.01)
*H04L 29/08* (2006.01)
*H04W 72/04* (2009.01)

(52) U.S. Cl.
CPC ....... *H04L 67/325* (2013.01); *H04W 72/0446* (2013.01); *H04L 67/06* (2013.01); *H04L 67/322* (2013.01)

(58) Field of Classification Search
CPC .......................... H04W 72/00; H04W 72/0446
See application file for complete search history.

(56) References Cited

U.S. PATENT DOCUMENTS

| | | | | |
|---|---|---|---|---|
| 6,456,967 B1 * | 9/2002 | Yeom | .................... | H04L 1/0006 704/220 |
| 2002/0008781 A1 * | 1/2002 | Corl | .................... | H04N 17/004 348/571 |
| 2010/0067401 A1 * | 3/2010 | Medvedev | ............ | H04L 1/0002 370/253 |
| 2010/0095336 A1 * | 4/2010 | Hirano | ............. | H04N 21/23611 725/109 |
| 2012/0005366 A1 | 1/2012 | Ma et al. | | |
| 2012/0311174 A1 * | 12/2012 | Bichot | ............. | H04N 21/44209 709/231 |

(Continued)

FOREIGN PATENT DOCUMENTS

EP 2 874 077 5/2015

OTHER PUBLICATIONS

L. Chen, Y. Zhou and D. M. Chiu, "Smart Streaming for Online Video Services," in IEEE Transactions on Multimedia, vol. 17, No. 4, pp. 485-497, Apr. 2015. doi: 10.1109/TMM.2015.2405343.

*Primary Examiner* — Said M Elnoubi
(74) *Attorney, Agent, or Firm* — Harness, Dickey & Pierce, P.L.C.

(57) ABSTRACT

The present disclosure relates to a telecommunication method for operating a telecommunication device being coupled to a digital telecommunication network. The telecommunication device has a processor, a display device and a memory with an application. The telecommunication device is connectable via the network to a backend server with access to a database comprising a plurality of datasets. The method has: sending an initializing data request to the backend server requesting a first number of the datasets from the database; in response to receiving an initializing data packet with the requested first number of the datasets; and calculating a second number of the datasets to be requested by a second data request.

19 Claims, 11 Drawing Sheets

(56) References Cited

U.S. PATENT DOCUMENTS

| | | | | |
|---|---|---|---|---|
| 2013/0044743 A1* | 2/2013 | Zhang | ................... | H04W 28/18 370/338 |
| 2014/0161050 A1* | 6/2014 | Grinshpun | .......... | H04L 65/4069 370/329 |
| 2014/0169190 A1* | 6/2014 | Worrall | ................... | H04L 43/50 370/252 |

* cited by examiner

DATA TRANSFER FOR A TELECOMMUNICATION DEVICE

FIELD OF THE INVENTION

The invention relates to a telecommunication method for operating a mobile telecommunication device being coupled to a digital telecommunication network as well as a computer program product, a mobile telecommunication device and a telecommunication system for performing the respective method.

BACKGROUND AND RELATED ART

Regarding the continuous growth of data amounts provided for transmission in modern information systems, telecommunication systems transmitting data are faced with high performance requirements to be met.

The storage capacity of modern databases is steadily on the rise. In order to make large amounts of data stored in the databases accessible for a broad range of users, sufficient data transmission systems and methods are required which are able to handle these large amount of data. In order to be used, the large amounts of data have to be transmitted from the database via a telecommunication network to the devices requesting the data. Transmitting a large amount of data at once may lead to an overloading of the data connection provided by the network and/or the device receiving and loading the data causing a blocking of the data connection as well as the computer device until the transmission is finished. For example, LTE-Advanced according to 3GPP (3rd Generation Partnership Project) provides downlink peak bit rates of 100 Mbit/s (high mobility) to 1 Gbit/s (low mobility) and uplink peak bit rates of 500 Mbit/s, LTE provides downlink peak bit rates of 300 Mbit/s and uplink peak bit rates of 75 Mbit/s.

The data stored in a database may for example be accessed by a browser based application. So every time the user of a telecommunication device wants to open e.g. a table which shows the respective data the data has to be transmitted from the database to the device. Depending on the speed of the communication link between the database and the telecommunication device used, loading and displaying the data may take considerable time. In order to reduce the required amount of data to be transmitted at once, paging or scrolling may be used for displaying the data e.g. in form of a table. When paging, the operating system retrieves and displays data, e.g. from a secondary storage for use in a main memory, in same-size blocks called pages. Scrolling refers to sliding displayed data, e.g. texts or images, across a monitor or display, vertically or horizontally. By scrolling, as such, the layout of the text or image is not changed, but moves a user's partial view across a larger data structure like a text or image that is not wholly displayed. Thus, using paging or scrolling only part of the data is displayed at once. Thereby, the amount of data to be transmitted is reduced accordingly. While part of the data is displayed, the remaining data may be transmitted in advance or upon an explicitly requested when needed.

However, for some application there may be a need to display a large amount of data at once, for example when displaying charts instead of tables, in order to improve usability. For visualizations using charts paging or scrolling approaches, when displaying the data, may be disadvantageous due to the structural nature of the charts. In order to circumvent paging and/or scrolling, the complete amount of data to be displayed has to be loaded at once. However, transmitting and loading a large amount of data at once may lead to a temporary blocking of the data connection as well as the receiving device until the transmitting and loading is finished.

Thus, in order to make use of mass data stored in a database using a telecommunication device, an efficient method for operating a mobile telecommunication device is required. In particular, a method is required for efficiently transmitting data stored in a database comprising a plurality of datasets to be displayed on a telecommunication device all in all as fast as possible, wherein the data is to be displayed in its entirety.

SUMMARY

Various embodiments provide a telecommunication method, a computer program product, a mobile telecommunication device and a telecommunication system as described by the subject matter of the independent claims. Advantageous embodiments are described in the dependent claims.

In one aspect, the invention relates to a telecommunication device which is coupled to a digital telecommunication network. The telecommunication device comprises a processor, a display device and a memory with an application. The application comprises instructions that, when executed on the processor, cause the processor to display on the display device a graphical user interface. The telecommunication device is connectable via a communication link of the network to a backend server with access to a database comprising a plurality of datasets. The method comprises sending an initializing data request to the backend server requesting a first number of the datasets from the database, in response to the initializing data request receiving via the communication link an initializing data packet with the requested first number of the datasets, determining the size of the datasets of the initializing data packet, calculating a second number of the datasets to be requested by a second data request using the determined size, a delay time and a bit rate of the transmission of the datasets from the database via the backend server and the communication link to the telecommunication device, wherein the second number of the datasets is a maximum number of the datasets receivable with the bit rate within a predefined time slot, wherein the delay time is the predefined length of the interval at which data requests are successively sent by the telecommunication device, sending a second data request to the backend server requesting the second number of the datasets after the delay time has passed, and in response to the second data request receiving via the communication link a second data packet with the requested second number of the datasets.

This method may allow efficiently transmitting a plurality of datasets to be displayed on a telecommunication device all in all as fast as possible without blocking the communication link and/or communication device, wherein the data is to be displayed in its entirety.

A telecommunication device as used herein is a device that is able to transmit telephonic, electronic, digital, cellular, or radio communications via a network to another device. A telecommunication device may be, for example and without limitation, a mobile phone, in particular a smart phone, a tabloid computer, personal computer (PC) or the like. The telecommunication device may be configured to communicate via a wireless and/or wired telecommunication network.

A network may be any kind of wireless or wired information network. A network may be such that it can be implemented to work in a telecommunication system, i.e. as a telecommunication network for communication, i.e. information exchange, between two entities of the system. The telecommunication network may be compliant with one of the following: TCP/IP, Ethernet, ATM, CDMA, GSM, HSCSD, GPRS, WCDMA, EDGE, Bluetooth, UMTS, HSPA+, Teldesic, Iridium, Inmarsat, WLAN, LTE, LTE-Advanced, WiMAX, WiMAX-Advanced, and imode.

A telecommunication network as used herein is a collection of terminals, links, and processors which connect together so that communications can be made. In other words, it is a data communication network such as, for example, the Internet or an intranet. The telecommunication network may be a wired network. In particular, the telecommunication network may be a wireless network, e.g. a mobile communication network, also known as 'cellular network' distributed over land areas called cells, each served by at least one fixed-location transceiver, known as a cell site or base station. A 'mobile wireless cellular digital telecommunication network' is a telecommunication network that provides services by using a large number of base stations, each covering only a limited area. It may allow a number of mobile telecommunication devices to communicate with each other and with other devices anywhere in the network. For example, the cellular network may use Global Systems for Mobile Communication (GSM), Code Division Multiple Access (CDMA) or other technologies.

A communication link is a point-to-point data communication channel over a data network between two computer application programs, such as backend server and telecommunication device. In an exemplary embodiment, the communication link may be established for example using TCP/IP communication protocol and sockets. Once the connection has been established, the application programs may communicate with each other using for example remote procedure calls.

A database as used herein is an organized data, i.e. a collection of electronic information, i.e. data that is organized in memory or on a non-volatile storage volume in the form of a particular, defined data structure which supports or is optimized for data retrieval by a particular type of database query.

A database may be organized in tables or columns or other forms of data structures to provide efficient retrieval. An individual table may act as database. In conventional databases, all tables of the database have the same structure in respect to the physical organization of the data in the memory or on a non-volatile storage medium. For example, some row-oriented databases may comprise multiple tables which organize their data in a row-oriented manner. Some column-oriented databases may solely comprise tables which organize their data in a column-oriented manner. In said cases, the database and all its tables may structurally be optimized for a particular type of database query. According to some embodiments, the database is a relational database, in particular a column-oriented database or a row-oriented database.

Thus, a database as used herein encompasses a data file or repository which contains data that may be accessed by a processor. Examples of databases are, but are not limited to: a data file, a relational database, a file system folder containing data files, and a spreadsheet file.

A database may be controlled by a database management system (DBMS). A database management system as used herein is a designed software and/or hardware based system application that is specially designed to allow the definition, creation, querying, updating and administration of one or more databases. Typically, a DBMS is operable to interact with a user, with other applications, and one or more databases managed by the DBMS to process some requests and to analyze data. A DBMS may allow the definition, creation, querying, update, and administration of databases. Well-known DBMSs include MySQL, MariaDB, PostgreSQL, SQLite, Microsoft SQL Server, Microsoft Access, Oracle, SAP HANA, dBASE, FoxPro, IBM DB2, and others.

The database may in particular be an in-memory database. An in-memory database as used herein is a database managed by an in-memory database management system. An in-memory DBMS primarily relies on main memory for storing the data contained in the in-memory database. It is contrasted with database management systems that employ a disk storage mechanism. Typically, main memory databases are faster than disk-optimized databases since the internal optimization algorithms are simpler and execute fewer CPU instructions. Accessing data in memory eliminates seek time when querying the data, which provides faster and more predictable performance than disk.

An in-memory DBMS may store data on volatile memory devices. These devices lose all stored information when the device loses power or is reset. In this case, the in-memory DBMS can be said to lack support for the 'durability' portion of the ACID (atomicity, consistency, isolation, durability) properties. Volatile memory-based in-memory DBMS can, and often do support the other three ACID properties of atomicity, consistency and isolation. However, many in-memory DBMS may allow persisting the stored data by means of snapshot files, checkpoint images, or other mechanisms which record the state of the database at a given moment in time on a non-volatile storage. The in-memory DBMS may generate these periodically or when it does a controlled shut-down. Examples for an in-memory DBMS are SAP's HANA or Microsoft's SQL CE.

A database operation is an event, during which data elements are read from the database, during which data elements of the database are modified, during which data elements are removed from the database, or during which data elements are added to the database.

A data packet as used herein refers to a basic unit of communication over a digital network. A data packet may also be called a datagram, a segment, a block, a cell or a frame, depending on the protocol. Data packets vary in structure depending on the protocols implementing them. The precise structure of a data packet may depend on the type of packet and/or on the communication protocol used. In general, a data packet may comprise a header and a payload. The header provides overhead information about the data packet, the service and other transmission-related things. The payload comprises the data to be transmitted, e.g. a number of the datasets.

Herein, the delay time $T_D$ is the predefined length of the interval at which data requests are successively sent by the telecommunication device. In other words, the time between two successively sent data requests is $T_D$. When a data request is sent at time T, the next data request is sent at $T+T_D$, the next at $T+2 \cdot T_D$ and so on.

A telecommunication method for operating a mobile telecommunication device according to the independent claims may have the beneficial effect that the second number of the datasets and thus the size of the second data packet received in response to the second data request may be chosen such that the time required for fully receiving the second data packet does not exceed a predefined time slot, i.e. time interval. Thus, an upper limit for the time required for receiving the second data packet may be introduced. By this limit an interference of the second data request with any subsequently following data request may be avoided. The present method allows splitting a data request for requesting a plurality of datasets from a database to be displayed all together at once on a telecommunication device into a plurality of individual requests which are sent successively. Thereby, a large amount of data may be transmitted via the data link in form of a plurality of smaller data packets without continuously blocking the communication link and the processor of the telecommunication device due to the size of data requested at a single request. The data to be displayed is successively received until all data has been transmitted and may be displayed in its entirety. Thereby the size of the second data packet received in response to the second data request may be optimized such that the total time required for transmitting all datasets requested by all data requests is minimized.

The sending of the request may for example be performed using a network identification address. The network identification address may comprise for example a HTTP URL, FTP address etc.

Furthermore, by successively requesting datasets a uniform data transmission in predefined intervals and a corresponding uniform data processing in predefined intervals may be enabled. The successive processing of the received data may for example allow successively adding the datasets to a graphical user interface (GUI) upon receipt of each of the respective datasets. This may have the advantage that a graphical user interface which is intended to display a large amount of data or which requires a large amount of data to determine the displayed content may be generated stepwise until all data is displayed at once. Thus, the present method does not require waiting until all data is received before the respective graphical user interface is generated, but allows for displaying part of the data upon receipt of the initializing data request. This may allow to access and use first data displayed by the graphical user interface at an early stage of the transmission process. The displayed data may, depending on individual circumstances, provide a user with a sufficient overview of the data structure such that he may be able to continue his working process and reconsider the more detailed data later on, when the transmission process has been finished and all data is displayed at once.

The present invention may have the advantage that it allows efficiently transmitting large numbers of datasets, even though the size of the individual datasets requested is, at least at the beginning of the transmission, unknown to the telecommunication device. Using the size of the datasets of the initializing data packet, an approximate size of the datasets and thus the data packet which may be received in response to subsequent data requests may be determined. Provided with an approximate size of the datasets to be requested and at least an approximation of the bit rate of the connection between the database and the telecommunication device via the backend server and telecommunication network used for transmitting the respective datasets, the number of the datasets to be requested by a single data request, e.g. the second data request, may be chosen such that the second datasets may be received within a predefined time interval without delays.

According to embodiments, the first number of the datasets may be one. This number is the minimum number of the datasets which may be requested by a single data request. By requesting only one dataset, it may be ensured that the time for fully receiving the requested data packet is as short as possible even if the data amount comprised by the single dataset is large.

According to embodiments the first number of the datasets is for example an integer from the interval of 1-10, from the interval of 1-20, from the interval 1-25, from the interval 1-50, from the interval 1-100, from the interval 1-200, from the interval 1-250, from the interval 1-500, from the interval 1-750, or from the interval 1-1000. According to embodiments the number is selected from the above identified intervals using a random selection algorithm. An 'algorithm' is a computational procedure for solving a problem in a finite number of steps.

According to embodiments the first number of the datasets is for example 1, 10, 20, 25, 50, 75, 100, 200, 250, 500, 750, or 1000.

According to embodiments, the bit rate of the transmission of the datasets from the database via the backend server and the communication link to the telecommunication device may be approximated by the bit rate of the communication link, i.e. the maximum bit rate transmittable from the backend server to the telecommunication device and vice versa at a given point of time.

This may have the advantage that the bit rate may be approximated by the bit rate of the communication link provided by the network which may externally be provided to the mobile communication device by the network.

The bit rate of the transmission of the datasets from the database via the backend server and the communication link to the telecommunication device may be measured by measuring the actual time required for sending a data request until the receipt of the requested datasets is finished as well as the actual size of the datasets received within said time.

This may have the advantage that the bit rate also takes into account the time required for accessing the requested datasets within the database and transferring the same from the database to the backend server for transmission via the communication link.

According to embodiments, the predefined time slot is given by the delay time.

This feature may have the beneficial effect that the full time interval provided per request which length is given by the delay time may be used for requesting, transmitting and receiving the required datasets. Thus, neglecting the time for sending the data request, an approximately constant transmission rate may be achieved, which corresponds to a maximum transmission rate taking into account the constraint that no delay or overload occurs.

According to embodiments, the predefined time slot is given by the delay time minus a predefined idle time, wherein the idle time is a second time slot from the completion of the receipt of the second data packet until the sending of a consecutive data request at which no data transmission takes place.

This feature may have the beneficial effect that the telecommunication device and in particular the processor of the telecommunication device, as well as the communication link are not constantly blocked by the data request and transmission, but that there are at least the timeslots provided by the idle time, wherein transmission and processing capacities are available for performing additional tasks. Thus, it may be prevented that the graphical user interface, the application or the communication device freezes.

According to embodiments, the delay time corresponds to the time intervals at which new data is for example added in order to stepwise generate the graphical user interface. The delay time may be chosen such that the stepwise generation of the graphical user interface cause the impression to the human eyes that the displayed amount of data is continuously growing, i.e. such that a continuous evolution of the displayed data structure is displayed. According to embodiments, the delay time may be selected using the operating frequency of the processor and/or display device of the telecommunication device. The delay time may for example be chosen to be 10 ms, 100 ms, 1 s.

According to embodiments, in case that the calculated second number of the datasets is smaller than a predefined minimum number of the datasets, the delay time is increased such that the minimum number of the datasets is receivable with the bit rate within the predefined time slot.

This may have the advantage that the delay time may be adjusted depending on the actual size of the datasets to be transmitted, in case the individual datasets of the database may be too large to transmit a minimum number of the datasets within the delay time which comprise enough data such that the evolution of the graphical user interface due to the addition of the received datasets is recognizable. Thus, a freezing of the graphical user interface forcing the user to interrupt his work may be avoided.

Furthermore, this may have the beneficial effect that for the full transmission of all datasets the ratio of the number of idle times and thus the total idle time on the one hand and the total number of the datasets on the other hand does not become too large in order to avoid that the time required for the full transmission becomes too large. Furthermore, by extending the delay time, the total time required due to the overhead per data request may be reduced. Thus, the full transmission time may be reduced.

According to embodiments, a first receipt time for receiving the initializing data packet is determined by measuring the time required for sending the initializing data request until the receipt of the initializing data packet is completed, the first receipt time together with the size of the datasets of the initializing data packet are used to calculate the bit rate of the communication link.

This may have the beneficial effect, that by calculating the bit rate using the actual receipt time for receiving a requested data packet, also the data overhead caused by the data request as well as the influence of the database readout and data processing by the backend server, in particular bottleneck effects, are taken into account.

According to embodiments, for calculating the second number of the datasets an average dataset size is used using the number and size of the datasets of the initializing data packet.

This may have the beneficial effect that an average dataset size may be determined, thus compensating differences of the size of individual datasets by taking into account variations of the requested datasets.

According to embodiments, the number of the datasets requested by data requests following the second data request equals the second number of the datasets.

This may have the beneficial effect, that once the second number of the datasets is calculated, a respective second number of the datasets may be used as the number of the datasets to be requested by the subsequently following data request. Thus, it may be ensured that data packets sent in respond to the following data requests may be received within the predefined time interval. In case that for a last data request the remaining datasets to be requested from the database are smaller than the second number of data sets, the respective smaller number may be requested by the last data request.

According to embodiments, for calculating the second number of the datasets the size of the largest dataset comprised by the initializing data packet is used. Thus, it may be ensured that in case the requested dataset is larger than the average size of the datasets, it may be prevented that the predefined time interval is exceeded.

According to embodiments for calculating the second number of the datasets an average dataset size is used which is increased by an additional predefined factor. The additional factor may for example be 10%. This may have the advantage, that determining a too small average dataset size, due a constellation by which the initializing data request accidentally requests only small datasets, may be avoided.

According to embodiments, the number of the datasets requested by the data requests following the second data request is successively increased for each successive data request until a predefined threshold is reached.

This may have the beneficial effect that modern databases may be able to analyze request pattern and predict which datasets may be requested next. Thus, they may be able to preventively load datasets which may most likely be requested by the next data request. In case the predicted and already loaded datasets are requested, they may be provided much faster, thus saving the time usually required for loading the data. In general, for the database each request may be considered as a new request on its own. Nevertheless, modern databases are able to analyze previous requests and identify request patterns, which are used to predict which datasets may be requested within the near future. The more requests according to a common pattern are received by the database the better the prediction is. This effect may be referred to as a warm up of the database, i.e. over time the response rate of the database is increasing until a maximum response rate is reached. By successively increasing the number of the datasets requested by each subsequent data request, this effect may be efficiently taken into account and advantageously used for accelerating the time.

According to embodiments the number of the datasets requested may be uniformly increased from request to request. According to embodiments the number of the datasets requested may be exponentially increased from request to request. According to embodiments, the threshold may be defined as a number of the datasets, for which the predefined time interval is exceeded. According to this embodiment, the number of requested datasets may be increased until a number of the datasets is requested for which the predefined interval is exceeded. In this case, i.e. in case of exceedance, the second last number of the datasets may be used for the following data requests. According to embodiments, the threshold may be defined using the second number of the datasets. For example, the threshold may be defined as 110% of the second number of the datasets.

According to embodiments, the initializing data request is one of a set of initializing data requests, each initializing data request requesting a number of the datasets, for each initializing data request a receipt time is determined and the second number of the datasets is calculated using the determined receipt times.

This may have the beneficial effect that non-linear effects as well as mutual interdependencies between different factors may be taken into account. Based on the different numbers of datasets requested by different initializing requests as well as the receipt time of each of these requests, the maximum number of data requests receivable within the predefined interval may be determined more reliably.

According to embodiments the numbers of datasets request by the initializing data requests may be selected from a predefined range of numbers of datasets. According to embodiments the number of the datasets of the individual initializing data requests may be selected according to a random distribution. According to embodiments the number of the datasets requested by the individual initializing data requests may be selected according to an equidistant distribution. According to embodiments, the equidistant distribution may be a monotonically increasing discrete distribution.

According to embodiments, the numbers of datasets requested by the initializing data requests being iteratively calculated according to an optimization pattern for finding a maximum number of the datasets receivable with the bit rate within the predefined time slot starting with the first number of datasets as an initial value.

This may have the beneficial effect that the maximum number of the datasets receivable within the predefined time interval may be stepwise approximated. Every known suitable approximation pattern may be used, e.g. the bisection method or a golden section search.

According to embodiments, the receipt times for receiving the requested data packets of the second and successively following data requests are monitored and the requested numbers of the datasets of the successively following data requests are adjusted to changes of the receipt times exceeding a predefined range of tolerance compared to the second receipt time for receiving the second data packet.

This may have the advantage that changes, for example due to changes of the communication link like the quality of the data transmission, may be identified and the data transmission adjusted accordingly. This criterion may further take into account variations of the datasets requested. For example datasets requested according to a certain order may vary according to their place in the order. For example the first datasets may be smaller or larger than later datasets. Those changes of the size of the datasets and thus the time necessary for receiving a given number of the datasets may efficiently be taken into account, thus accelerating the transmission.

According to embodiments, the sizes of the datasets of data packets of the second and successively following data requests are monitored and the requested numbers of the datasets of the successively following data requests are adjusted to changes of the size of the datasets exceeding a predefined range of tolerance compared to the size of the datasets of the second data packet.

This may have the beneficial effect that variations of the size of the datasets may efficiently be taken into account. For example, in case of larger sizes of the datasets, the numbers of datasets requested by the individual data requests may be reduced. In case of smaller sizes of the datasets, the numbers of datasets requested by the individual data requests may be increased.

According to embodiments, the data comprised by the received datasets is displayed on the graphical user interface on the display device by successively adding the data of the received datasets to the graphical user interface upon receipt.

This may have the advantage that large amounts of data may be displayed in a direct evolutionary way such that information about the data may be provided already at a very early stage of the transmission and the generation of the respective graphical user interface. The user may use these early stages of evolution as first approximations of the total structure of data which is to be displayed entirely at once, when the generation of the data display on the GUI is finished.

A display or display device as used herein for displaying a graphical user interface encompasses an output device or a user interface adapted for displaying images or data. A display may output visual, audio, and or tactile data. Examples of a display include, but are not limited to: a computer monitor, a television screen, a touch screen, a tactile electronic display, a braille screen, a cathode ray tube (CRT), a storage tube, a bistable display, an electronic paper, a vector display, a flat panel display, a vacuum fluorescent display (VF), a light-emitting diode (LED) displays, an electroluminescent display (ELD), a plasma display panels (PDP), a liquid crystal display (LCD), an organic light-emitting diode displays (OLED), a projector, or a head-mounted display.

In another aspect, the invention relates to a computer program product which comprises a computer readable storage medium having machine executable instructions embodied therewith. The machine executable instructions are executable by a processor controlling a mobile telecommunication device with a display device. Execution of the machine readable instructions by the processor causes the processor to display on the display device a graphical user interface. The mobile telecommunication device is connectable via a communication link of a digital telecommunication network to a backend server with access to a database comprising a plurality of datasets. Execution of the machine readable instructions by the processor further causes the processor to send an initializing data request to the backend server requesting a first number of the datasets from the database, receive in response to the initializing data request via the communication link an initializing data packet with the requested first number of the datasets, determine the size of the datasets of the initializing data packet, calculate a second number of the datasets to be requested by a second data request using the determined size, a delay time and a bit rate of the transmission of the datasets from the database via the backend server and the communication link to the telecommunication device, wherein the second number of the datasets is a maximum number of the datasets receivable with the bit rate within a predefined time slot, wherein the delay time is the predefined length of the interval at which data requests are successively sent by the telecommunication device, send a second data request to the backend server requesting the second number of the datasets after the delay time has passed, and receive in response to the second data request via the communication link a second data packet with the requested second number of the datasets.

The term computer readable storage medium should be taken to include a single medium or multiple media, e.g. a centralized or distributed database, and/or associated caches and servers that store the one or more sets of instructions. The term 'computer-readable storage medium' shall also be taken to include any medium that is capable of storing or encoding a set of instructions for execution by a processor that cause the processor to perform any one or more of the methods of the present invention, or that is capable of storing or encoding data structures utilized by or associated with such a set of instructions. A 'computer-readable storage medium' shall accordingly be taken to include, but not be limited to, solid-state memories, optical and magnetic media, etc. such as, but not limited to, any type of disk including floppy disks, optical disks, CD-ROMs, and magnetic-optical disks, read-only memories (ROMs), random access memories (RAMs), magnetic or optical cards, or any type of media suitable for storing electronic instructions.

Embodiments of the computer program product may comprise computer-executable instructions for performing each of the above described embodiments of the method.

One or more sets of instructions and data structures embodying or utilized by any one or more of the methods or functions described herein are stored on the computer readable storage medium. The software may also reside, completely or at least partially, within the memory and/or within the processor during execution thereof by the memory and the processor also constituting computer readable media. The software may further be transmitted or received over a network via the network interface device utilizing any one of a number of well-known transfer protocols, e.g. HTTP.

In another aspect, the invention relates to a mobile telecommunication device. The mobile telecommunication device is coupled to a digital telecommunication network. The mobile telecommunication device comprises a processor, a display device and a memory with an application. The application comprises instructions that, when executed on the processor, cause the processor to display on the display device a graphical user interface. The telecommunication device is connectable via a communication link of the network to a backend server with access to a database comprising a plurality of datasets. The mobile telecommunication device is configured for sending an initializing data request to the backend server requesting a first number of the datasets from the database, in response to the initializing data request receiving via the communication link an initializing data packet with the requested first number of the datasets, determining the size of the datasets of the initializing data packet, calculating a second number of the datasets to be requested by a second data request using the determined size, a delay time and a bit rate of the transmission of the datasets from the database via the backend server and the communication link to the telecommunication device, wherein the second number of the datasets is a maximum number of the datasets receivable with the bit rate within a predefined time slot, wherein the delay time is the predefined length of the interval at which data requests are successively sent by the telecommunication device, sending a second data request to the backend server requesting the second number of the datasets after the delay time has passed, and in response to the second data request receiving via the communication link a second data packet with the requested second number of the datasets.

The present invention also relates to an apparatus, i.e. telecommunication device, for performing the operations herein. This device may be specially constructed for the required purposes, or it may comprise a computer device configured for telecommunication which is selectively activated or reconfigured for the required purposes by a computer program stored in the computer device. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and each coupled to a computer system bus.

Embodiments of the mobile telecommunication device may comprise and be configured for executing computer-executable instructions for performing each of the above described embodiments of the method.

In another aspect, the invention relates to a telecommunication system comprising a mobile telecommunication device and a backend server, the telecommunication device and the backend server being coupled to a digital telecommunication network, the telecommunication device comprising a processor, a display device and a memory with an application, the application comprising instructions that, when executed on the processor, cause the processor to display on the display device a graphical user interface, the telecommunication device being connectable via a communication link of the network to the backend server, the backend server having access to a database comprising a plurality of datasets, the system being configured for sending an initializing data request from the telecommunication device to the backend server requesting a first number of the datasets from the database in response to the initializing data request receiving by the telecommunication device from the backend server via the communication link an initializing data packet with the requested first number of the datasets, determining the size of the datasets of the initializing data packet, calculating a second number of the datasets to be requested by a second data request using the determined size, a delay time and a bit rate of the transmission of the datasets from the database via the backend server and the communication link to the telecommunication device, wherein the second number of the datasets is a maximum number of the datasets receivable with the bit rate within a predefined time slot, wherein the delay time is the predefined length of the interval at which data requests are successively sent by the telecommunication device, sending a second data request from the telecommunication device to the backend server requesting the second number of the datasets after the delay time has passed, and in response to the second data request receiving by the telecommunication device from the backend server via the communication link a second data packet with the requested second number of the datasets.

Embodiments of the telecommunication system may comprise and be configured for executing computer-executable instructions for performing each of the above described embodiments of the method.

It is understood that one or more of the aforementioned embodiments of the invention may be combined as long as the combined embodiments are not mutually exclusive.

BRIEF DESCRIPTION OF THE DRAWINGS

In the following embodiments of the invention are explained in greater detail, by way of example only, making reference to the drawings in which.

DETAILED DESCRIPTION

Figure 1:
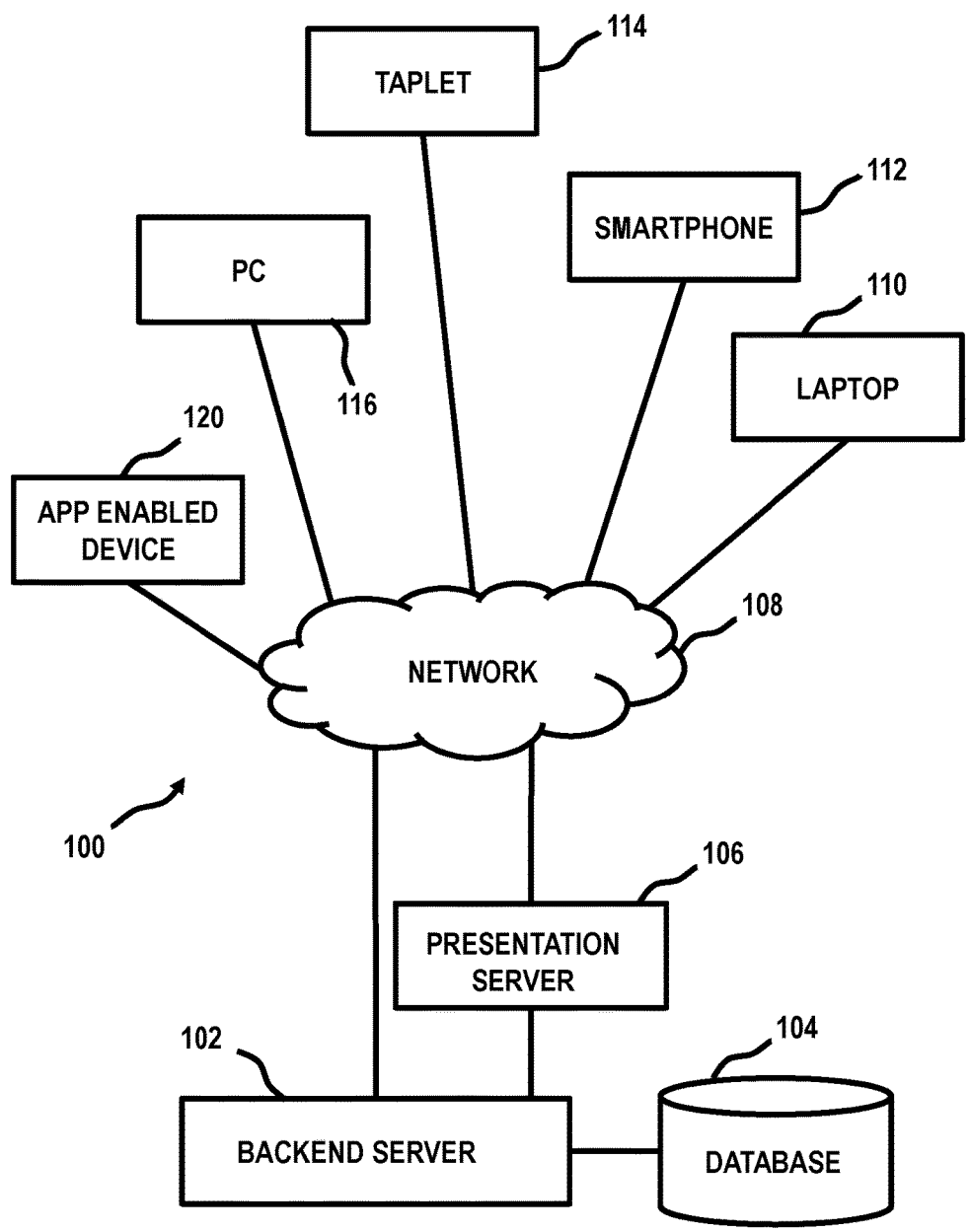
FIG. 1 depicts a first schematic diagram illustrating an exemplary telecommunication system.

In the following, similar elements are designated by the same reference numerals.

Various embodiments herein include one or more of systems, method, software, and data structures that are utilized in presenting data within graphical user interfaces of mobile devices. Some embodiments may be considered as spanning two layers of a technical data processing infrastructure: 1) a backend data processing system of an enterprise, such as an enterprise resource planning (ERP), customer relationship management (CRM), and the like; according to examples, this layer may also comprise a presentation server that operates between the backend server and mobile devices of users to maintain for example stateful network sessions there between, to transform data of the backend server into telecommunication device, in particular mobile device presentation-friendly forms, and to proxy data processing requests from mobile devices to the backend server; and 2) telecommunication devices that present data to users and receive input with regard to data and data processing activities.

The mobile telecommunication devices as described and illustrated herein include tablet computing devices, smartphones, computing devices, and the like. However, telecommunication devices may also include devices with applications that execute within web browsers, PCs with monitors or other display devices, smart controllers within automobiles or home appliances, and other devices that are executing respective applications.

As mentioned above, examples may comprise a presentation server operating between a backend server and mobile devices of users. The presentation server may be configured to communicate with processes of the backend server to establish stateful data processing sessions with the backend server upon request from applications executed on a mobile device. The presentation server includes presentation templates, stored in the presentation server or a template repository. The presentation templates include mappings between forms of data that are received from the backend server and how the data is to be presented within a mobile device application. Similarly, presentation templates may also include mappings between mobile device application events, such as data requests, data processing requests, i.e. show detail data, retrieve data, etc., and processes, functions, services, and objects of the backend server. The mappings provide instructions to transform data, transform data requests, and perform other transforms of particular embodiments.

These and other embodiments are described in the following with reference to the figures.

In the following detailed description, reference is made to the accompanying drawings that form a part hereof, and in which specific embodiments in which the inventive subject matter may be practiced are shown by way of illustration. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term 'invention' merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 depicts a first schematic diagram illustrating an exemplary telecommunication system 100, according to an example embodiment. The system 100 is an example computing environment within which various embodiments may be implemented.

The system 100 includes a backend server 102 of an enterprise, such as one or more of an enterprise resource planning (ERP), customer relationship management (CRM), human resources management (HRM), a transaction processing system, an order processing system, a banking system, and the like. The backend server 102 is connected with a database 104 comprising a plurality of datasets stored therein. The backend server 102 and the database 104 may both be parts of a common unit or parts of separate units.

The backend server 102 may be deployed to one or more computing devices, such as one or more enterprise-class server computers, virtual machines, and the like. The backend server 102 may be accessed by other systems and programs that execute and various computing devices throughout the system 100. For example, the backend server 102 may be accessed via a network 108 by thick-client or thin-client applications as may be deployed to personal computers 116, by other software systems, and other clients. The backend server 102 may also be accessed by a presentation server 106 either directly or via the network 108.

According examples, the backend server 102 may directly communicate with the telecommunication devices 110, 112, 114, 116, 120 via a communication link of the network 108.

According examples, the presentation server 106 may operate in the networked environment of the system 100 between the backend server 102 and telecommunication devices 110, 112, 114, 116, 120. The presentation server 106 may also operate with web browser applications as may be deployed to web browser applications of personal computers 110 and other computing devices. The presentation server 106 may communicates with processes of the backend server 102 to establish stateful data processing sessions with the backend server 102 upon request from applications that execute on mobile devices 110, 112, 114, 116, 120.

The presentation server 106 may be deployed as an add-on module to the backend server 102 and operate on the same or different hardware thereof, in some embodiments. However, in other embodiments, the presentation server 106 may be deployed as a standalone program that executes on one or more distinct computing devices or virtual machines from the backend server 102. In some embodiments, the presentation server 106 is hosted by a third party, such as in a cloud-computing type arrangement.

The presentation server 106 includes presentation templates, stored in the presentation server 106 or a template repository 107. The presentation templates include mappings between forms of data that are received from the backend server 102 and how the data is to be presented within an application installed on a mobile device 110, 112, 114, 116, 120. Similarly, presentation templates may also include mappings between mobile device 110, 112, 114, 116, 120 application events, such as data requests, data processing requests, i.e. show detail data, purchase a product, retrieve data, etc., and processes, functions, services, and objects of the backend server 102. The mappings provide instructions to transform data, transform data requests, and perform other transforms of particular embodiments.

The network 108 is generally a network capable of transporting data between computing devices of the various functional data processing elements of the system 100, such as the backend server 102, the presentation server 106, personal computers 110 and the various mobile devices 110, 112, 114, 116, 120. The network 108 may include both wired and wireless connections. The network 108 is intended to represent one or more of virtually any type of network capable of transporting data as described, such as one or more of a local area network, a wide area network, a system area network, a value added network, a virtual private network, a cellular network, the Internet, and other such networks.

Figure 2:
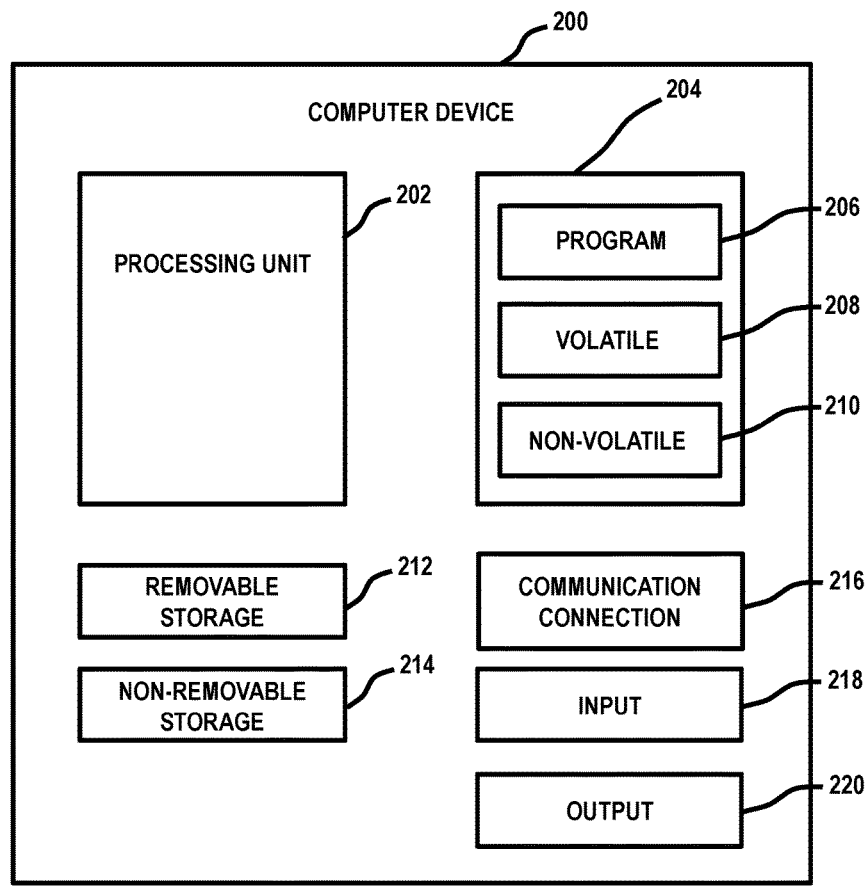
FIG. 2 depicts a schematic diagram illustrating an exemplary telecommunication device.

FIG. 2 depicts a schematic diagram illustrating an exemplary telecommunication device 200 in form of a computer device configured for telecommunication. In one embodiment, multiple such computer devices 200 may be utilized in a distributed network to implement multiple components in a transaction-based environment. An object-oriented, service-oriented, or other architecture may be used to implement such functions and communicate between multiple systems and components. One example telecommunication device 200 in form of a computing device may include a processing unit 202, i.e. processor, memory 204, removable storage 212, and non-removable storage 214. Although the example computing device 200 is illustrated and described as a PC, the computing device may be in different forms in different embodiments. For example, the computing device may instead be a smartphone, a tablet, or other computing device including the same or similar elements as illustrated and described with regard to FIG. 2. Further, although the various data storage elements are illustrated as part of the device 200, the storage may also or alternatively include cloud-based storage accessible via a network, such as the Internet.

The memory 204 of the device 200 may include a volatile memory 206 and a non-volatile memory 208. The device 200 may include or have access to a computing environment that includes a variety of computer-readable media, such as volatile memory 206 and non-volatile memory 208, removable storage 212 and non-removable storage 214. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), digital versatile discs (DVD) or other optical disk storage, magnetic cassettes, magnetic tape, magnetic disk storage or other magnetic storage devices, or any other medium capable of storing computer-readable instructions. The device 200 may include or have access to a computing environment that includes input 218, output 220, and a communication connection 216. The input 218 may include one or more of a touchscreen, touchpad, mouse, keyboard, camera, and other input devices. The device 200 may operate in a networked environment using a communication connection 216 to connect to one or more remote computer devices, such as database servers, web servers, and other computing device. An example remote computer device may include a personal computer (PC), server, router, network PC, a peer device or other common network node, or the like. The communication connection 216 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 202 of the device 210. A hard drive (magnetic disk or solid state), CD-ROM, and RAM are some examples of articles including a non-transitory computer-readable medium. For example, various computer programs or applications, such as one or more applications and modules implementing one or more of the methods illustrated and described herein or an application that executes on a mobile device or is accessible via a web browser, may be stored on a non-transitory computer-readable medium.

Figure 3:
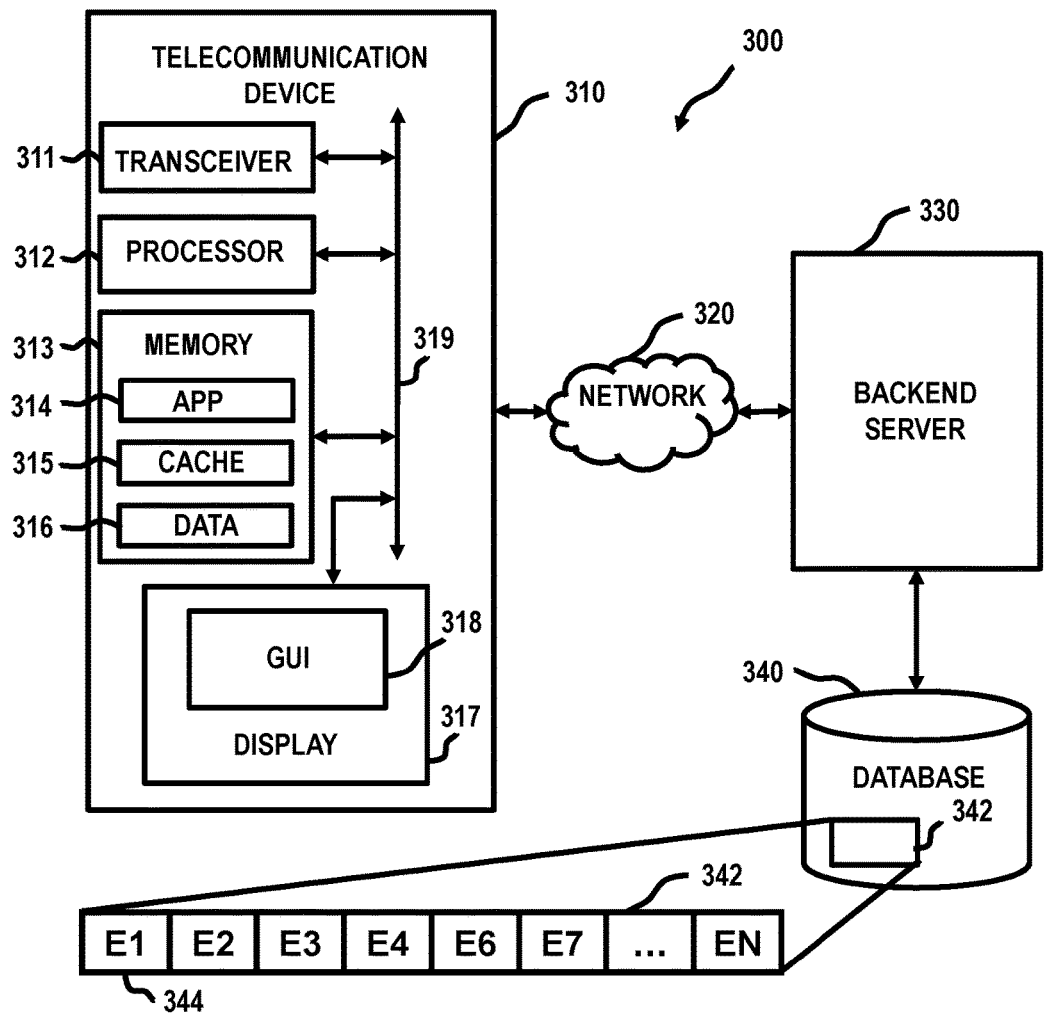
FIG. 3 depicts a second schematic diagram illustrating an exemplary telecommunication system.

FIG. 3 depicts a second schematic diagram illustrating an exemplary telecommunication system 300, such as e.g. system 100 of FIG. 1, comprising an exemplary mobile telecommunication device 310, such as e.g. client device 110, 112 or 114 of FIG. 1. The telecommunication system 300 may comprise, for example, a cellular digital telecommunication system. The mobile telecommunication device 310 may comprise a processor 312, a transceiver 311, a memory 313, e.g. a main memory, each capable of communicating with one or more components of the mobile telecommunication device 310. For example, all components are coupled to a bidirectional system bus 319. The mobile telecommunication device 310 may further comprise a cache 315. Although, the cache 315 is shown as a portion of the memory 313, it may alternatively be separate from the memory 313 as a separate memory cache component, e.g. SRAM.

The processor 312 may be a microprocessor, a single core processor, a multicore processor or the like. The processor 312 may control the operation of the mobile telecommunication device 310. The transceiver 311 may be implemented as a transmitting and receiving component of the mobile telecommunication device 310. The mobile telecommunication device 310 may further comprise a display device 317 which displays characters and images and the like. The display device 317 may be configured to display a graphical user interface (GUI) 318. For example, the display device 317 may be a touch sensitive display screen.

The mobile telecommunication device 310 may be connected to a backend server 330, e.g. backend server 102 of FIG. 1, through a network 320 such as a mobile wireless cellular digital telecommunication network. The backend server 330 may be a computer system comprising one or more computer devices.

For example, the mobile telecommunication device 310 may be directly connected to the backend server 330 or via a base station (not shown) of the cellular-digital wireless telecommunication system. For that, the mobile telecommunication device 310 may for example establish a communication link over the network 320 with the backend server 330.

Using the transceiver 311, the mobile telecommunication device 310 may exchange data with the backend server 330 via the network 320. For example, the network 320 may comprise any number and combination of networks.

The backend server 330 may have control access to one or more databases 340 containing one or more data tables such as data table 345. The data table 345 may comprise a plurality of entries 344, e.g. E1, E2, E3, E4, E6, E7, . . . , EN, each in form of a dataset.

Memory 313 may be configured to store one or more mobile applications 314 that are executable on the processor 312. Memory 313 may further comprise a data module 316.

A mobile application 314 of the one or more mobile applications comprises instructions that, when executed by the processor 312, cause the processor 312 to generate on the display device 317 a graphical user interface 318. The mobile application 314 may comprise for example, a web application, a browser, or a calendar application etc.

The data module 316 may be responsible for controlling the data transmission from the database 340, via the backend server 330 and the network 320, e.g. via the established communication link. For example, the data may be received in form of a data packet comprising a number of the datasets in response to a data request sent by the data module 316 via the network 320, e.g. via the established communication link. For example, the sending of the data request may be triggered by a selection of a user interface element of the graphical user interface 318.

The application 314 may encode instructions that when executed on the processor 312 cause the processor 312 to display on the graphical user interface 318, e.g. in form of a chart, the data comprised by the datasets received from the data module 316.

Figure 4:
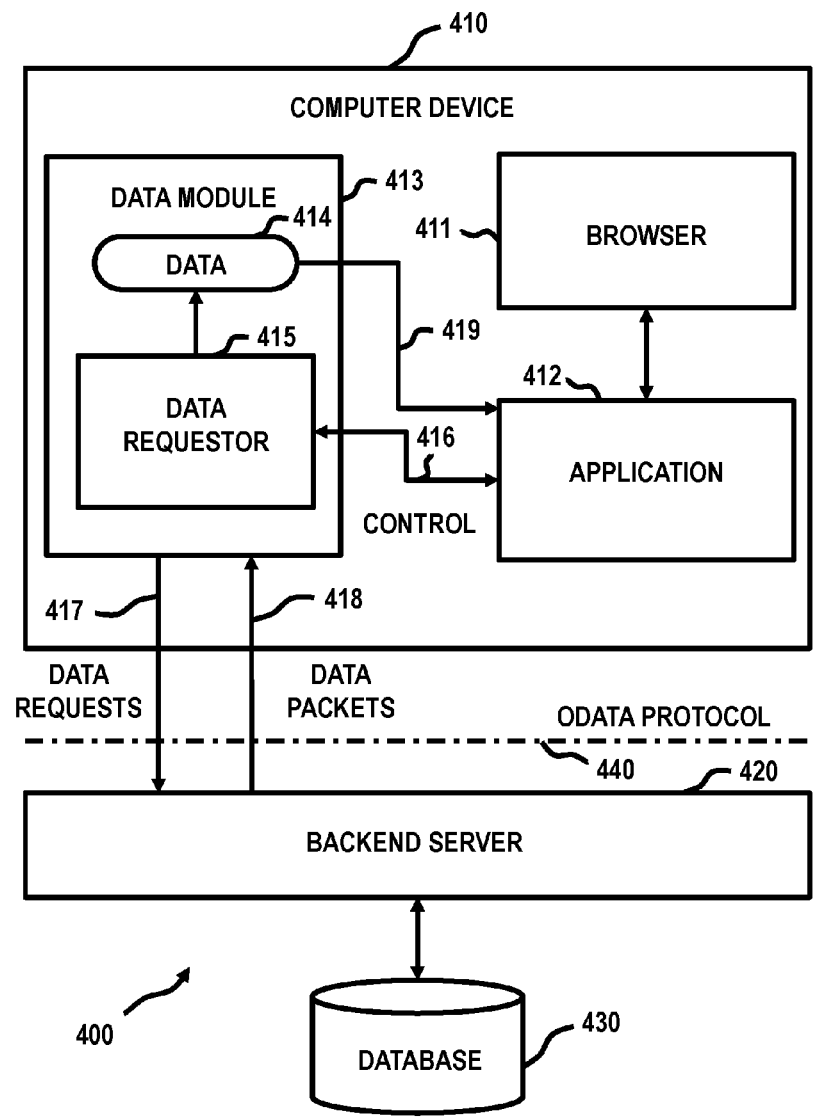
FIG. 4 depicts a third schematic diagram illustrating an exemplary telecommunication system.

FIG. 4 shows a schematic diagram of an exemplary arrangement of a telecommunication system comprising a telecommunication device 410, a backend server 420 and a database 430. The telecommunication device 410 comprises an application using a browser 411 to display a graphical user interface. The graphical user interface to be displayed by the browser 411 requires a large amount of data which is stored in the database 430 in form of a plurality of datasets. The application 416 controls a data requestor 415 which is part of a data requesting and receiving module 413. The data requestor 415 in order to provide the application 416 with the required data successively sends a plurality of data requests 417 to the backend server 420 using for example the OData protocol 440. The backend server 420 accesses the requested datasets in the database 430 and provides the same in the form of a plurality of data packets 418, each being sent successively in response to a corresponding data request from the data requestor 415. The data 414 received by the data module 413 is provided to the application 412 to be displayed on the graphical user interface of the browser 411. The application may control the data module 413 and in particular the data requestor 415 by sending instructions which datasets are required, wherein the data requestor 415 comprises machine-executable instructions for performing the present method. Thus, the data requestor 415 inter alia generates and sends an initializing data request to the backend server 420 requesting a first number of data requests. Based on the present method the number of the datasets requested by each of the following data requests is dynamically determined such that the speed of data transmission and processing is optimized.

The Open Data Protocol (OData) is an open protocol allowing the creation and consumption of queryable and interoperable RESTful APIs, i.e. it is an application-level protocol for interacting with data via RESTful web services. The OData protocol supports the description of data models and the editing and querying of data according to those models providing a uniform way to describe both the data and the data model. Thus, semantic interoperability between systems is improved and an ecosystem enabled. RESTful (Representational State Transfer) refers to a software architecture for building scalable web services. REST provides a coordinated set of constraints to the design of components in a distributed hypermedia system that can lead to a higher performing and more maintainable architecture. An API (Application Programming Interface) refers to a set of routines, protocols, and tools for building software applications. An API may express software components in terms of their operations, inputs, outputs, and underlying types. In view of REST services, an API may refer to a specification of remote calls exposed to an API user. Hypermedia refers to a nonlinear media of information including, but not restricted to graphics, audio, video, plain text and hyperlinks.

The data retrieval may for example be based on the OData-protocol. The OData-protocol offers parameters to reduce the amount of data to be loaded at once. It is possible to split the loading of large amounts of data into a plurality of requests 'request1', 'request2', 'request3' etc. by using the parameters 'skip' and 'top': Request1 may e.g. use skip=0, top=100, request2 skip=100, top=100, and request3 skip=200, top=100. Thus, data is retrieved by chunks of 100 datasets.

The 'top' option specifies that only the first n entries should be returned, where n is a non-negative integer value specified by the 'top' query option. For example, top=100 returns only the first 100 entries of the database.

The 'skip' query option specifies that the result must not include the first n entries, where n is a non-negative integer value specified by the 'skip' query option. For example, skip=100 returns entries starting with the 101th entry.

When using 'top' and 'skip' in combination, the 'skip' option is applied before the 'top' option, regardless of the order in which they appear in the request. For example, top=100, skip=100 returns the 101th through 200th entry.

Based on a number of starting parameters, the present invention may autonomously load data packets according to an optimized splitting scheme for the large amount of data to be loaded and inform the user about the status and/or progress. A further benefit may be provided by an encapsulation of the invention as a JavaScript object which may easily transported, e.g. loaded on a mobile device, wherein the invention acts an independent module.

The invention may provide the following options:

| | |
|---|---|
| packetSize | number of the datasets requested by each request |
| requestDelay | time to wait in ms until next data packet is requested |
| ODataServiceUrl | root-url for the OData requests |
| ODataPath | sub-path for specific data sources |
| ODataParameters | all parameters OData API supports |

Flags may be provided for indicating whether the data is loaded completely. By validating the flags it may be to checked, whether the data is loaded completely or not.

Figure 5:
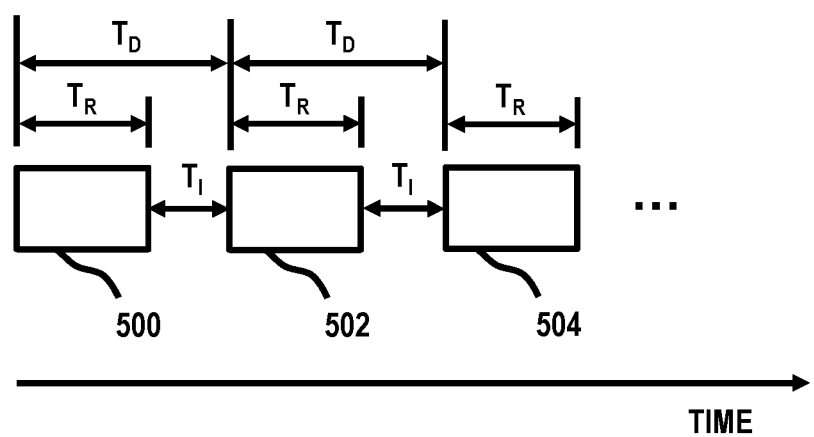
FIG. 5 depicts a schematic diagram illustrating an exemplary plurality of data packet transmissions.

FIG. 5 shows an example of a plurality of data packet transmissions 500, 502, 504 wherein each transmission comprises the time required for sending the respective data request until the receipt of the corresponding data packet is finished. This time is given by the receipt time $T_R$. The time after the receipt of a packet is finished until the sending of the next data request is defined as the idle time $T_I$, which provides a timeslot for the telecommunication device as well as the communication link to be used for performing additional tasks. During the idle time $T_I$ no data transmission takes place. The sum of the receipt time $T_R$ and the idle time $T_I$ is defined as the delay time $T_D$ which is the time between the sending of two successive data requests. Thus, data requests are sent at intervals of length $T_D$, i.e. at the end of the respective intervals.

Figure 6:
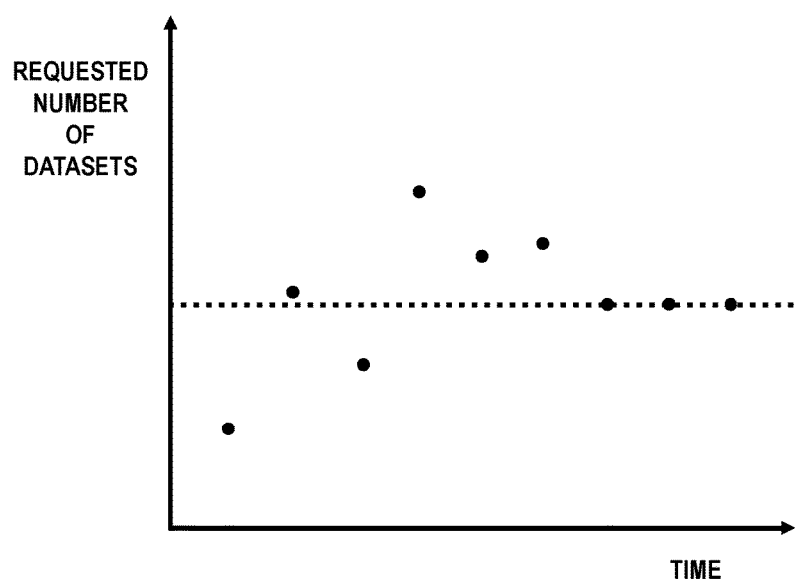
FIG. 6 depicts a first schematic diagram illustrating an exemplary determination of a second number of the datasets.

FIG. 6 shows a schematic diagram of an exemplary determination of a second number of the datasets. The first six requested numbers of datasets each belong to an initializing data request. The respective numbers of datasets requested by the respective six initializing data requests are selected according to a random distribution. For each number of datasets the respective receipt time is determined. Using the pairs of the number of datasets and the receipt time, the receipt time as a function of a requested number of the datasets may be approximated and the maximum number of the datasets receivable within a predefined time interval may be identified. The following last three data requests comprise the determined second number of the datasets as the number of the datasets to be requested. The second number of datasets is indicated by the dotted line.

Figure 7:
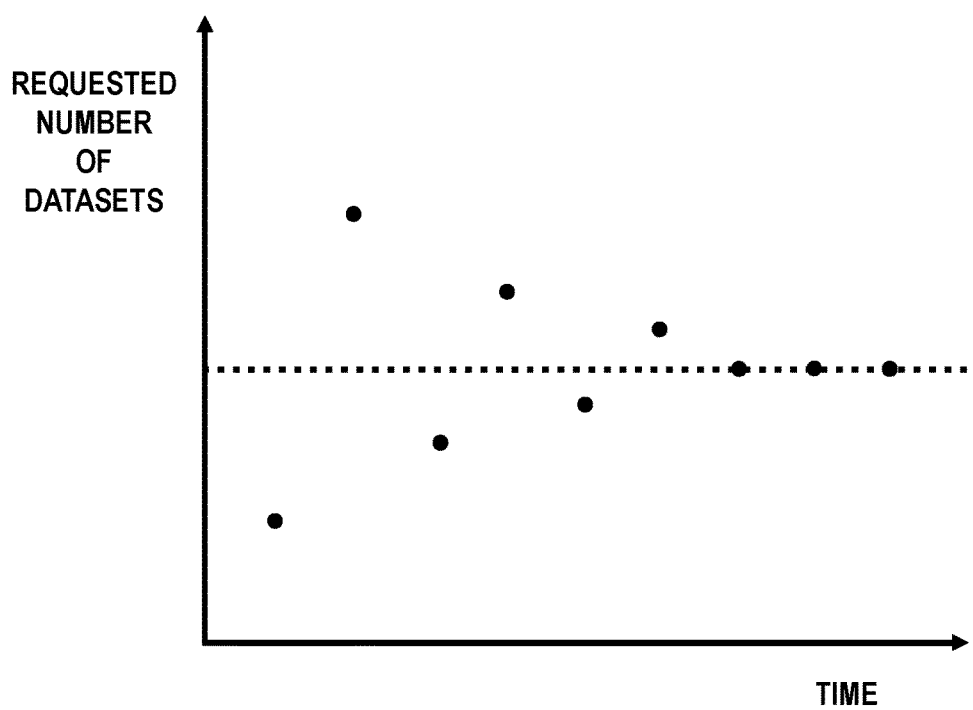
FIG. 7 depicts a second schematic diagram illustrating an exemplary determination of a second number of the datasets.

FIG. 7 shows a further schematic diagram of an exemplary determination of the second number of the datasets. Again, the first six data requests are initializing data requests, wherein the number of the datasets requested by each of these initializing data requests is determined using an optimization pattern, such that the requested numbers of datasets converge towards the maximum number of the datasets receivable within a predefined interval of time. The maximum number of the datasets is the second number of datasets indicated by the dotted line which is requested by the following last three data requests.

Figure 8:
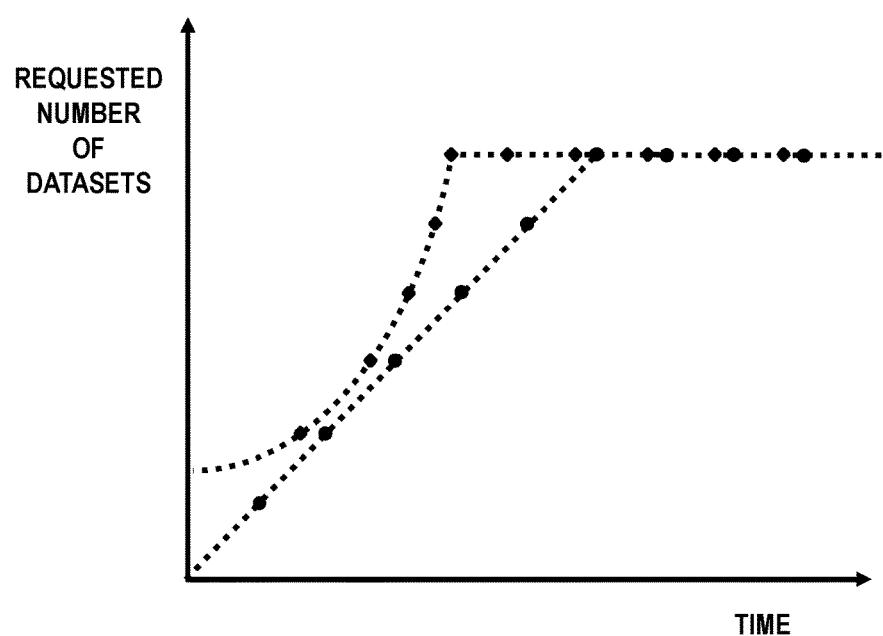
FIG. 8 depicts a schematic diagram illustrating an exemplary evolution of the requested number of the datasets.

FIG. 8 shows a schematic diagram of an exemplary evolution of the requested number of the datasets. The number of the datasets requested by the data request following the second data request is successively increased for each successive data request until a predefined threshold, indicated by the horizontal dotted line, is reached. A first example indicated by circles shows a linear increase of the numbers of the datasets until the threshold is reached. A second example indicated by diamonds shows an exponential increase of the requested numbers of the datasets. By increasing the requested numbers of the datasets the acceleration of data provision by modern databases due to the analysis of previous requests and the prediction of following requests may be efficiently used to reduce the time necessary for transmitting the complete amount of data required by the telecommunication device.

Figure 9:
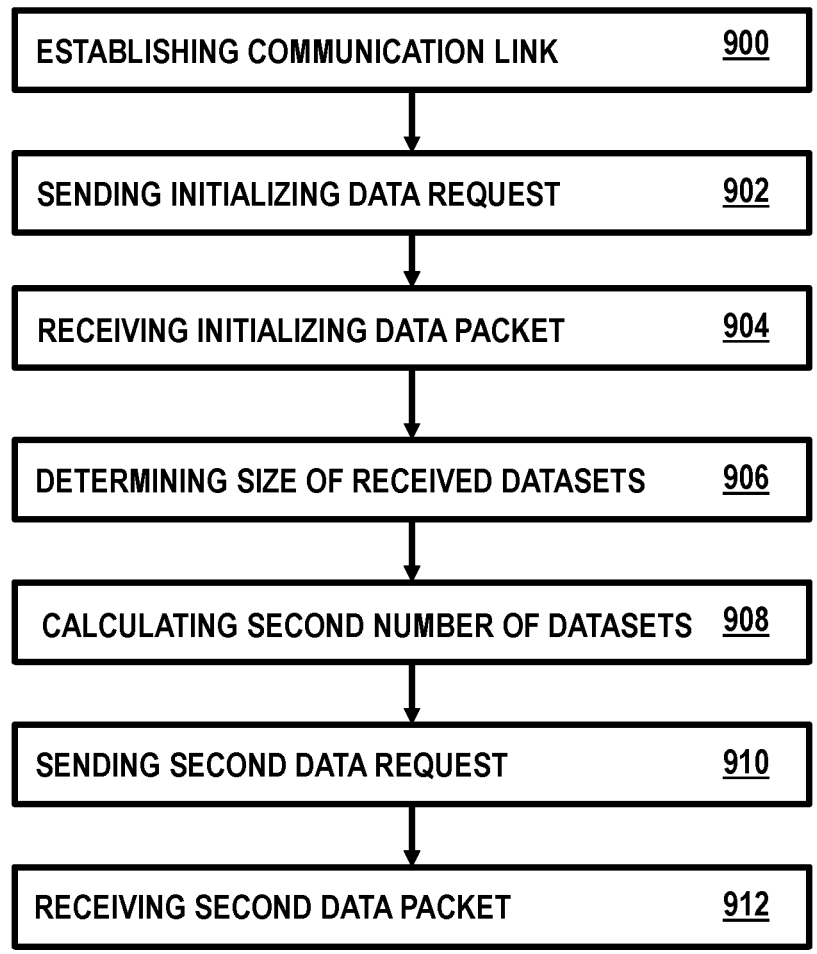
FIG. 9 depicts a first schematic flow diagram of a method for operating a telecommunication device.

FIG. 9 depicts a schematic flow diagram of a method for operating a telecommunication device. In block 900 a communication link between the telecommunication device and the backend server over a network is established. In block 902 an initializing data request is sent to the backend server via the communication link requesting a first number of datasets. In response to the initialization request an initializing data packet providing the requested first number of datasets is received in block 904. In block 906 the size of datasets of the initializing data packet is determined. In step 908 a second number of datasets to be requested by the second data request is calculated using the size determined in block 906, e.g. an average size per dataset, the delay time and a bit rate of the transmission. The bit rate of the transmission may for example be calculated by measuring the receipt time of the initializing data packet and the size of the datasets determined in block 906. In block 910 a second data request is sent via the communication link to the backend server requesting the second number of datasets. In step 912 once the second data request is received via the communication link a second data packet with the requested second number of datasets is received. The method may be continued by subsequently requesting datasets until the complete amount of data required by the telecommunication device has been received.

According to an alternative embodiment steps 902-906 may be repeated such that a set of initializing data requests is successively sent to the backend server. In this case, the second number of the datasets in block 908 may be calculated using the numbers of datasets requested by each of the initializing data requests in combination with the corresponding receipt times.

Figure 10:
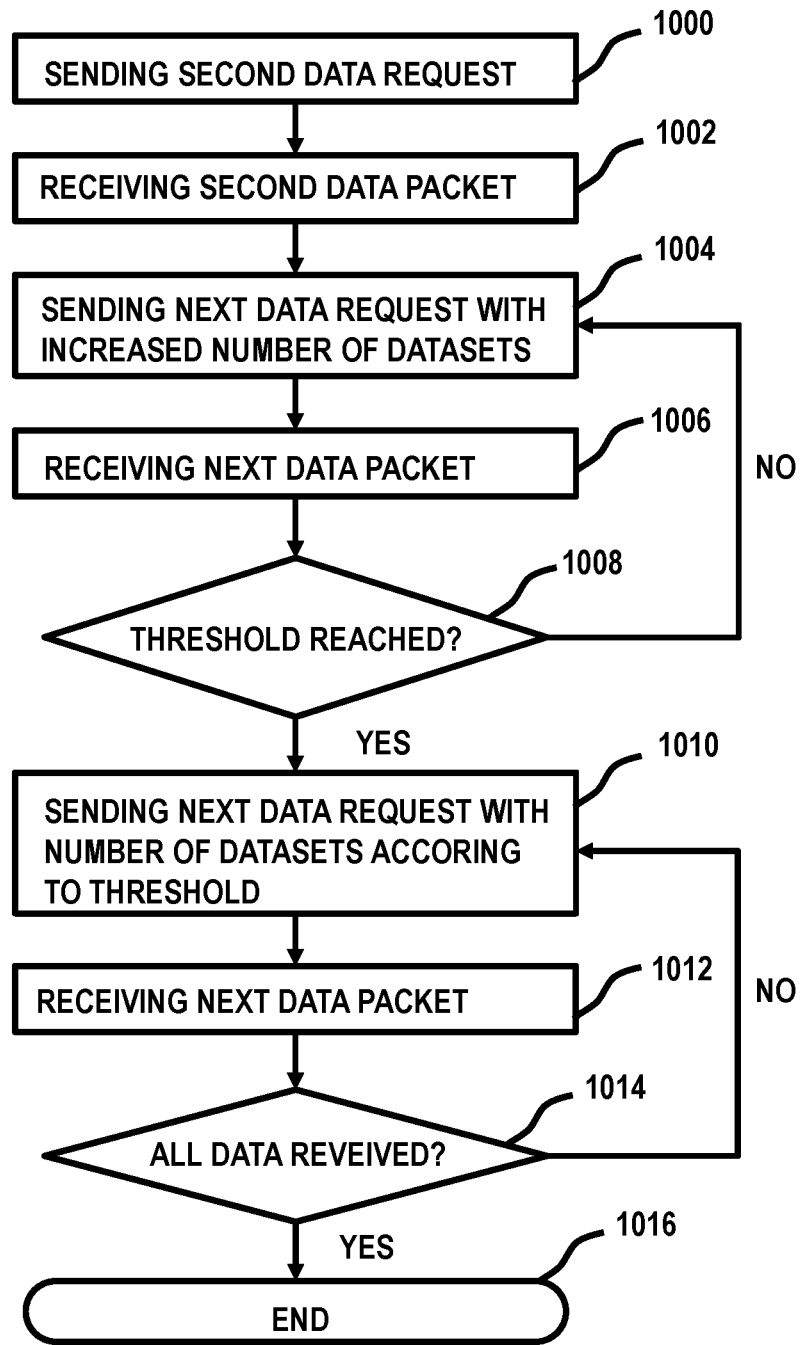
FIG. 10 depicts a second schematic flow diagram of a method for operating a telecommunication device.

FIG. 10 shows a schematic flow diagram of an exemplary method comprising an increase of the requested numbers of datasets. In block 1000 the second data request is sent. In block 1002, in response to the sending of the second data request a second data packet is received. In block 1004 the next data request is sent to the backend server requesting an increased number of datasets. In step 1006 a data packet with the requested increased number of datasets is received in response to the sending of data request in block 1004. In step 1008 it is checked whether the threshold for increasing the number of requested data packets is reached. In case the threshold is not reached the method continues with block 1004. In case the threshold is reached, the method continues with block 1010 sending a data request requesting a number of datasets according to the threshold, e.g. the last number of datasets requested before the threshold was reached. In responds, the requested number of datasets according to the threshold is received in block 1012. In block 1014 it is checked whether all datasets to be requested by data requests have been received, i.e. whether the complete amount of data required by the telecommunication device has been transmitted. In case not all datasets have been received yet, the method continues with block 1010. In case all datasets have been received the method ends in block 1016.

Figure 11:
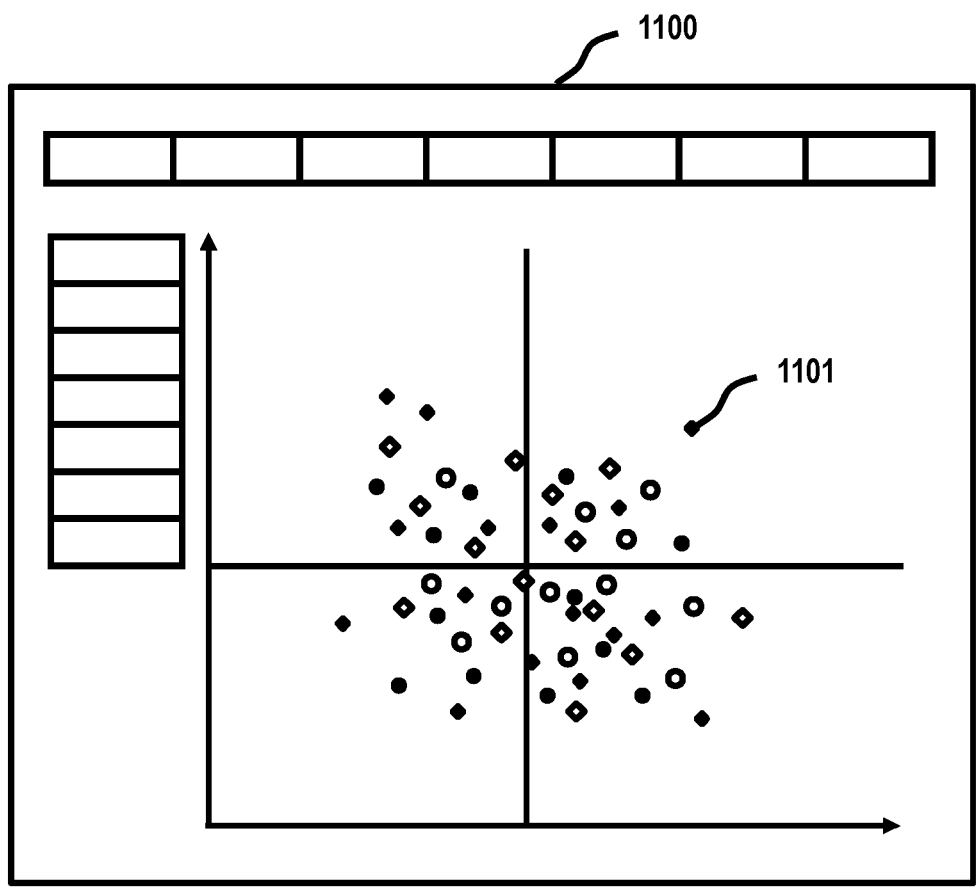
FIG. 11 depicts a schematic diagram of an exemplary graphical user interface.

FIG. 11 depicts a schematic diagram of an exemplary graphical user interface 1100 shown in a browser application of a telecommunication device. The graphical user interface 1100 depicts the datasets of a plurality of data packets. Each data point 1101 displayed on the graphical user interface 1100 represents one dataset. The datasets from the same data packet are indicated by the same form of the data point 1101. The exemplary graphical user interface depicted in FIG. 11 displays four groups of datasets from for data packets each group of datasets being exemplarily indicated by a specific form of data point: massive and perforated circles, massive and perforated diamonds. The four data packets are successively received one after another. The data points from each data packet are added to the graphical user interface 1100 upon received such that the content of the graphical user interface 1100 gradually evolves, until all datasets are shown at once as depicted in FIG. 11.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

LIST OF REFERENCE NUMERALS 100 system
102 backend server 104 database
106 presentation server
108 network
110 laptop
112 smartphone
114 tablet
116 PC
120 application enabled device
200 computer
202 processing unit
204 memory
206 program
208 volatile memory
210 non-volatile memory
212 removable storage
214 non-removable storage
216 communication connection
218 input
220 output
300 telecommunication system
310 telecommunication device
311 transceiver
312 processor
313 memory
314 application
315 cache
316 data module
317 display
318 GUI
319 bus
320 network
330 backend server
340 database
342 table
344 entry/dataset
400 telecommunication system
410 computer device
411 browser
412 application
413 data module
414 data
415 data requestor
416 control
417 data requests
418 data packets
419 data connection
420 backend server
430 database
440 OData protocol
500 data transmission
502 data transmission
504 data transmission
1100 GUI
1101 data point

The invention claimed is:

1. A telecommunication method for operating a telecommunication device being coupled to a digital telecommunication network, the telecommunication device comprising a processor, a display device and a memory with an application, the application comprising instructions that, when executed on the processor, cause the processor to display on the display device a graphical user interface, the telecommunication device being connectable via a communication link of the network to a backend server with access to a database comprising a plurality of datasets each having a dataset size, the method comprising:

sending an initializing data request to the backend server requesting a first number of datasets, of the plurality of datasets, from the database;

in response to the initializing data request, receiving via the communication link an initializing data packet with the requested first number of datasets, where the first number of datasets are transmitted from the database via the backend server and the communication link to the telecommunication device at an initial bit rate;

determining, from the initializing data packet, the size of the first number of datasets of the initializing data packet;

calculating a subsequent number of datasets, of the plurality of datasets, to be requested by a subsequent data request using the determined size, a delay time and the initial bit rate, wherein the subsequent number of datasets is a maximum number of datasets receivable with the initial bit rate within a defined time slot, wherein the delay time is a defined duration at which data requests are successively sent by the telecommunication device; and in one or more successive intervals until the plurality of datasets have been received:
sending a subsequent data request to the backend server requesting the subsequent number of datasets, of the plurality of datasets, after the delay time has passed;
in response to the subsequent data request receiving via the communication link a subsequent data packet with the requested subsequent number of the datasets, and
recalculating the subsequent number of datasets based on the second data packet,
wherein the size of the subsequent number of datasets in each subsequent data packet is unmodified and where the datasets in each subsequent data packet are transmitted from the database via the backend server and the communication link to the telecommunication device at the initial bit rate, and
displaying on the graphical user interface on the display device the data in the received datasets by successively adding the data of the received datasets to the graphical user interface upon receipt.

2. The method of claim 1, wherein the defined time slot is given by the delay time.

3. The method of claim 1, wherein the defined time slot is given by the delay time minus a defined idle time, wherein the idle time is a second time slot from the completion of the receipt of the subsequent data packet until the sending of a consecutive data request at which no data transmission takes place.

4. The method of claim 1, in case that the calculated subsequent number of datasets is smaller than a defined minimum number of datasets, the delay time is increased such that the minimum number of datasets is receivable with the bit rate within the defined time slot.

5. The method of claim 1, wherein the bit rate of the transmission of the datasets from the database via the backend server and the communication link to the telecommunication device is approximated by the bit rate of the communication link.

6. The method of claim 1, wherein a first receipt time for receiving the initializing data packet is determined by measuring the time required for sending the initializing data request until the receipt of the initializing data packet is completed, the first receipt time together with the size of the datasets of the initializing data packet being used to calculate the bit rate of the communication link.

7. The method of claim 1, wherein for calculating the subsequent number of datasets an average dataset size is used using the number and size of the datasets of the initializing data packet.

8. The method of claim 1, wherein for calculating the subsequent number of datasets an average dataset size increased by an additional defined factor is used using the number and size of the datasets of the initializing data packet.

9. The method of claim 1, wherein a number of datasets requested by additional data requests equal the subsequent number of datasets.

10. The method of claim 1, wherein a number of datasets requested by additional data requests is successively increased for each successive data request until a defined threshold is reached.

11. The method of claim 10, wherein a number of the respective datasets requested is uniformly increased, following each successive request.

12. The method of claim 10, wherein a number of the respective datasets requested is exponentially increased following each successive request.

13. The method of any of claim 1, wherein the initializing data request is one of a set of initializing data requests, each initializing data request requesting a number of the datasets, for each initializing data request a receipt time is determined and the subsequent number of datasets is calculated using the determined receipt times.

14. The method of claim 9, wherein the numbers of datasets requested by the initializing data requests is iteratively calculated according to an optimization pattern for finding a maximum number of the datasets receivable with the bit rate within the predefined time slot starting with the first number of datasets as an initial value.

15. The method of claim 1, wherein the receipt times for receiving the requested data packets of the subsequent and successively following data requests are monitored and the requested numbers of datasets of the successively following data requests are adjusted to changes of the receipt times exceeding a predefined range of tolerance compared to the second receipt time for receiving the subsequent data packet.

16. The method of claim 1, wherein the sizes of the datasets of data packets of the subsequent and successively following data requests are monitored and the requested numbers of datasets of the successively following data requests are adjusted to changes in the size of the datasets exceeding a defined range of tolerance compared to the size of the datasets of the subsequent data packet.

17. A non-transitory computer readable storage medium having machine executable instructions embodied therewith, the machine executable instructions being executable by a processor controlling a telecommunication device with a display device, execution of the machine readable instructions by the processor causing the processor to display on the display device a graphical user interface, the telecommunication device being connectable via a communication link of a digital telecommunication network to a backend server with access to a database comprising a plurality of datasets each having a dataset size, execution of the machine readable instructions by the processor further causing the processor to:
send an initializing data request to the backend server requesting a first number of datasets, of the plurality of datasets, from the database;
receive in response to the initializing data request, via the communication link, an initializing data packet with the requested first number of datasets, where the requested first number of datasets are transmitted from the database via the backend server and the communication link to the telecommunication device at an initial bit rate;
determine, from the initializing data packet, the size of the first number of datasets of the initializing data packet;
calculate a second number of datasets, of the plurality of datasets, to be requested by a subsequent data request using the determined size, a delay time and the initial bit rate, wherein the second number of datasets is a maximum number of the datasets receivable with the initial bit rate within a predefined time slot, wherein the delay time is the defined length of the interval at which data requests are successively sent by the telecommunication device; and
in one or more successive intervals until the plurality of datasets have been received:
send a subsequent data request to the backend server requesting the subsequent number of datasets after the delay time has passed;
receive in response to the second data request via the communication link a second data packet with the requested second number of datasets, and
recalculate the second number datasets;
wherein the size of the subsequent datasets in each subsequent data packet is unmodified and where the datasets in each subsequent data packet are transmitted from the database via the backend server and the communication link to the telecommunication device at the initial bit rate; and
displaying on the graphical user interface on the display device the data in the received datasets by successively adding the data of the received datasets to the graphical user interface upon receipt.

18. A telecommunication device, the telecommunication device being coupled to a digital telecommunication network, the telecommunication device comprising a processor, a display device and a memory with an application, the application comprising instructions that, when executed on the processor, cause the processor to display on the display device a graphical user interface, the telecommunication device being connectable via a communication link of the network to a backend server with access to a database comprising a plurality of datasets each having a dataset size, the telecommunication device being configured for:
sending an initializing data request to the backend server requesting a first number of datasets, of the plurality of datasets, from the database;
in response to the initializing data request, receiving via the communication link an initializing data packet with the requested first number of datasets, where the requested first number of datasets are transmitted from the database via the backend server and the communication link to the telecommunication device at an initial bit rate;
determining, from the initializing data packet, the size of the datasets of the initializing data packet;
calculating a subsequent number of the datasets, of the plurality of datasets, to be requested by a subsequent data request using the determined size, a delay time and the initial bit rate, wherein the subsequent number of datasets is a maximum number of the datasets receivable with the initial bit rate within a defined time slot, wherein the delay time is the defined length of the interval at which data requests are successively sent by the telecommunication device; and in one or more successive intervals until the plurality of datasets have been received:
sending subsequent data request to the backend server requesting the subsequent number of datasets, of the plurality of datasets, after the delay time has passed;
in response to the subsequent data request receiving via the communication link a subsequent data packet with the requested subsequent number of datasets; and
recalculating the subsequent number of datasets;
wherein the size of the datasets in each subsequent data packet is unmodified and where the datasets in each subsequent data packet are transmitted from the database via the backend server and the communication link to the telecommunication device at the initial bit rate; and
displaying on the graphical user interface on the display device the data in the received datasets by successively adding the data of the received datasets to the graphical user interface upon receipt.

19. A telecommunication system comprising a telecommunication device and a backend server, the telecommunication device and the backend server being coupled to a digital telecommunication network, the telecommunication device comprising a processor, a display device and a memory with an application, the application comprising instructions that, when executed on the processor, cause the processor to display on the display device a graphical user interface, the telecommunication device being connectable via a communication link of the network to the backend server, the backend server having access to a database comprising a plurality of datasets each having a dataset size, the system being configured for:
sending an initializing data request from the telecommunication device to the backend server requesting a first number of datasets, of the plurality of datasets, from the database;
in response to the initializing data request receiving by the telecommunication device from the backend server via the communication link an initializing data packet with the requested first number of datasets, where the requested first number of datasets are transmitted from the database via the backend server and the communication link to the telecommunication device at an initial bit rate;
determining, from the initializing data packet, the size of the datasets of the initializing data packet;
calculating subsequent number of datasets, of the plurality of datasets, to be requested by subsequent data request using the determined size, a delay time and the initial bit rate, wherein the subsequent number of the datasets is a maximum number of the datasets receivable with the initial bit rate within a defined time slot, wherein the delay time is the defined length of the interval at which data requests are successively sent by the telecommunication device; and
in one or more successive intervals until the plurality of datasets have been received:
sending a subsequent data request from the telecommunication device to the backend server requesting the subsequent number of datasets, of the plurality of datasets, after the delay time has passed;
in response to the subsequent data request receiving by the telecommunication device from the backend server via the communication link a subsequent data packet with the requested subsequent number of datasets; and
recalculating the subsequent number of datasets;
wherein the size of the datasets in each subsequent data packet is unmodified and where the datasets in each subsequent data packet are transmitted from the database via the backend server and the communication link to the telecommunication device at the initial bit rate; and
displaying on the graphical user interface on the display device the data in the received datasets by successively adding the data of the received datasets to the graphical user interface upon receipt.

* * * * *